US012281655B1

United States Patent
Zhu

(10) Patent No.: US 12,281,655 B1
(45) Date of Patent: Apr. 22, 2025

(54) STEPLESS REGULATION FAN

(71) Applicant: Guangdong Aoyun Technology Co., Ltd., Guangdong (CN)

(72) Inventor: Xueping Zhu, Guangdong (CN)

(73) Assignee: Guangdong Aoyun Technology Co., Ltd., Huizhou (CN)

( * ) Notice: Subject to any disclaimer, the term of this patent is extended or adjusted under 35 U.S.C. 154(b) by 0 days.

(21) Appl. No.: 18/818,066

(22) Filed: Aug. 28, 2024

Related U.S. Application Data

(63) Continuation-in-part of application No. 18/533,880, filed on Dec. 8, 2023, now Pat. No. 12,119,717.

(51) Int. Cl.
| | |
|---|---|
| F04D 25/06 | (2006.01) |
| F04D 25/08 | (2006.01) |
| F04D 25/16 | (2006.01) |
| F04D 27/00 | (2006.01) |
| H02K 7/14 | (2006.01) |
| H02K 11/33 | (2016.01) |

(52) U.S. Cl.
CPC ..... F04D 25/0606 (2013.01); F04D 25/0673 (2013.01); F04D 25/166 (2013.01); F04D 27/004 (2013.01); H02K 7/14 (2013.01); F04D 25/08 (2013.01); H02K 11/33 (2016.01)

(58) Field of Classification Search
CPC ...... H02K 11/33; H02K 7/14; H02K 11/0094; H02K 2211/00; H02P 5/68; H02P 7/28
See application file for complete search history.

(56) References Cited

U.S. PATENT DOCUMENTS

| | | | | |
|---|---|---|---|---|
| 8,241,011 B2* | 8/2012 | Huang | ................. | F04D 19/024 |
| | | | | 417/244 |
| 2009/0228147 A1* | 9/2009 | Lim | ........................ | F24F 11/30 |
| | | | | 700/275 |
| 2018/0209433 A1* | 7/2018 | Sun | ......................... | F04D 25/06 |
| 2022/0042517 A1* | 2/2022 | Lazar | .................... | F04D 29/661 |
| 2022/0142327 A1* | 5/2022 | Lei | ........................ | A45D 20/12 |
| 2022/0246027 A1* | 8/2022 | Lee | ......................... | G08C 17/02 |
| 2022/0252078 A1* | 8/2022 | Tsao | ........................ | H03K 7/08 |
| 2023/0243368 A1* | 8/2023 | Zhu | ..................... | F04D 25/0693 |
| | | | | 415/213.1 |

* cited by examiner

Primary Examiner — Zoheb S Imtiaz

(57) ABSTRACT

A stepless regulation fan includes a fan main body and a control circuit board. The fan main body is equipped with first motors and fan blades connected to the first motors. The control circuit board includes an MCU, a stepless regulation element and a first driving circuit. The stepless regulation element and the first driving circuit are electrically connected to the MCU. The stepless regulation element is used for user operation, and the first driving circuit is electrically connected to the first motors. When the stepless regulation element is operated, a stepless regulation signal within a preset regulation range is fed back to the MCU. Based on the stepless regulation signal, the MCU outputs a rotating speed control signal corresponding to the stepless regulation signal to the first driving circuit. The first driving circuit adjusts driving power output to the first motors based on the rotating speed control signal.

20 Claims, 13 Drawing Sheets

STEPLESS REGULATION FAN

CROSS-REFERENCE TO RELATED APPLICATIONS

This application is a Continuation-in-Part of the U.S. application Ser. No. 18/533,880 filed on Dec. 8, 2023, and entitled "CONTROL CIRCUIT FOR FAN," now pending, the entire disclosures of which are incorporated herein by reference.

TECHNICAL FIELD

The present invention relates to the technical field of fans, particularly to a stepless regulation fan.

BACKGROUND ART

As is well known, a fan is a device used for cooling. At present, the existing fans generally use buttons to adjust an air speed. The air speed of the fan usually includes three levels, with a first level having a low air speed, a second level having a medium air speed, and a third level having a high air speed. In the mode of speed levels, the air speed cannot be freely adjusted, which affects the user experience.

SUMMARY

A main purpose of the present invention is to provide a stepless regulation fan for solving the problem that existing fans cannot freely adjust an air speed.

In order to solve the above technical problem, the following technical solution is provided by the present invention.

A stepless regulation fan includes a fan main body and a control circuit board. The fan main body is equipped with first motors and fan blades connected to the first motors. The control circuit board includes an MCU, a stepless regulation element and a first driving circuit. The stepless regulation element and the first driving circuit are electrically connected to the MCU. The stepless regulation element is used for user operation, and the first driving circuit is electrically connected to the first motors.

When the stepless regulation element is operated, a stepless regulation signal within a preset regulation range is fed back to the MCU. Based on the stepless regulation signal, the MCU outputs a rotating speed control signal corresponding to the stepless regulation signal to the first driving circuit. The first driving circuit adjusts driving power output to the first motors based on the rotating speed control signal.

Furthermore, the stepless regulation element is a potentiometer.

The potentiometer includes a base, a movable member, a resistance wire, a first pin, a second pin, a third pin, and a slider. The resistance wire, the first pin, the second pin, the third pin, and the slider are all arranged on the base. The movable member is rotationally or slidingly provided on the base. The movable member is connected to the slider. The slider is electrically connected to the second pin, and the slider is in contact with the resistance wire. Two ends of the resistance wire are respectively electrically connected to the first pin and the third pin. The third pin is grounded, and the first pin is electrically connected to the MCU.

The slider moves when the movable member is operated, so that a resistance connected to the MCU is continuously increased or decreased to feed back the stepless regulation signal within the preset regulation range to the MCU.

Furthermore, the stepless regulation element is a rotary encoder switch. The rotary encoder switch includes a first pin and a second pin. Both the first pin and the second pin are electrically connected to the MCU.

When the rotary encoder switch is rotated, the first pin and the second pin respectively feed back a continuously changing first electrical signal and a continuously changing second electrical signal to the MCU. The MCU outputs the rotating speed control signal to the first driving circuit based on the changes in the first electrical signal and the second electrical signal. The stepless regulation signal includes the first electrical signal and the second electrical signal.

Furthermore, the control circuit board also includes a power module that is electrically connected to the MCU, the first driving circuit, and the stepless regulation element, respectively.

Furthermore, the first driving circuit includes a first switch transistor. A grid electrode of the first switch transistor is connected to the MCU, a source electrode of the first switch transistor is grounded, a drain electrode of the first switch transistor is electrically connected to a negative electrode of the first motor, and an output terminal of the power module is electrically connected to a positive electrode of the first motor. The first switch transistor adjusts the power output to the first motor based on the rotating speed control signal output by the MCU.

Furthermore, the first driving circuit includes a boost regulation unit. The boost regulation unit is electrically connected to the power module, the MCU, and the first motor, respectively.

The boost regulation unit boosts a voltage output by the power module according to the rotating speed control signal output by the MCU and then outputs the voltage to the first motor.

Furthermore, the boost regulation unit includes a boost unit, a first inductor, and a first diode.

The output terminal of the power module is electrically connected to a positive electrode of the first motor through the first inductor and the first diode in sequence. The boost unit is electrically connected to an output terminal of the first inductor.

The boost unit conducts at a corresponding frequency based on the rotating speed control signal output by the MCU to charge and discharge the first inductor, so as to boost the voltage output by the power module and output the voltage to the first motor.

Furthermore, the boost unit includes a boost chip and a plurality of regulating resistors. One end of each of the regulating resistors is respectively electrically connected to a different pin of the MCU, and an opposite end of each of the regulating resistors is electrically connected to an enable pin of the boost chip.

A switch pin of the boost chip is electrically connected to the output terminal of the first inductor. A feedback pin of the boost chip is also electrically connected to an output terminal of the first diode. An output pin of the boost chip is connected to the output terminal of the first diode, and the enable pin of the boost chip is electrically connected to the MCU.

The MCU outputs an enable electrical signal to the enable pin of the boost chip based on the stepless regulation signal, and selects a plurality of regulating resistors to output a regulation electrical signal to the feedback pin of the boost chip. The boost chip conducts an internal switch transistor at a corresponding frequency based on the enable electrical signal, so as to charge and discharge the first inductor, and to boost the voltage output by the power module. The output pin of the boost chip adjusts the boosted voltage based on the regulation electrical signal and then outputs the boosted voltage to the first motor.

Furthermore, a total number of the regulating resistors is twelve.

Furthermore, the boost unit includes a second switch transistor. A first end of the second switch transistor is electrically connected to the MCU, a second end of the second switch transistor is grounded, and a third end of the second switch transistor is electrically connected to the output terminal of the first inductor.

The second switch transistor receives a PWM signal output by the MCU for turning on and off, so as to boost and regulate the voltage output by the power module through the first inductor. The first inductor outputs the boosted voltage to the first motor.

Furthermore, the first driving circuit further includes a first interface. The first interface is electrically connected to the first motor. A drain electrode of the first switch is electrically connected to the negative electrode of the first motor through the first interface, and the output terminal of the power module is electrically connected to the positive electrode of the first motor through the first interface.

Furthermore, the first driving circuit further includes a first filtering unit. The first filtering unit includes a filtering capacitor. One end of the filtering capacitor is grounded, and an opposite end of the filtering capacitor is respectively electrically connected to the first interface and the output terminal of the first diode.

Furthermore, the fan main body includes an operating member. The operating member is connected to the stepless regulation element. The stepless regulation element follows the operating member to move when the operating member is operated.

The operating member is arranged on the fan main body through one of the ways of rotating, rolling, and sliding.

Furthermore, the fan main body includes a fan head, a supporting base, and a second motor for controlling rotation of the fan head. The first motors and the fan blades are both mounted on the fan head, the second motor is mounted on the supporting base or the fan head, and the control circuit board is mounted on the fan head or the supporting base.

The control circuit board also includes a second driving circuit and a first switch both electrically connected to the MCU. The second driving circuit is electrically connected to the power module and the second motor, respectively. The MCU drives the second motor to operate through the second driving circuit based on an electrical signal fed back by the first switch.

Furthermore, the second driving circuit includes a motor driving chip, a second filtering unit, a third filtering unit, and a second interface. The second filtering unit is electrically connected to an output terminal of the power circuit and the motor driving chip, respectively. The second filtering unit is used for filtering a voltage output by the power circuit and then supplying the voltage to the motor driving chip. The third filtering unit is electrically connected to the motor driving chip and the second interface, respectively. The second interface is electrically connected to the second motor. The third filtering unit is used for filtering a driving voltage output by the motor driving chip and then supplying the driving voltage to the second motor. A sixth pin and a seventh pin of the motor driving chip are both grounded. An SDA pin and an SCK pin on the motor driving chip are respectively electrically connected to the MCU.

Furthermore, the stepless regulation element is a press switch encoder, and the first switch is a switch on the press switch encoder.

Furthermore, the power module includes a power interface for connecting to a power supply and a power circuit electrically connected to the power interface. The power circuit is respectively electrically connected to the MCU and the first driving circuit.

Furthermore, the power module further includes a battery electrically connected to the power circuit. The power circuit is a charging and discharging circuit used for charging the battery with the power input from the power interface.

The power circuit includes a charging and discharging chip. The charging and discharging chip is electrically connected to the power interface and a positive electrode of the battery, respectively. The charging and discharging chip is electrically connected to the MCU for detecting a temperature of the MCU.

Furthermore, the power module further includes a battery protection circuit electrically connected to the power circuit and the battery, respectively. The battery protection circuit stops charging the battery when the battery is overcharged or stops the battery from continuing to output voltage when the battery is over discharged. The battery protection circuit includes a battery protection chip electrically connected to the battery.

Furthermore, the control circuit board also includes a power indication circuit electrically connected to the MCU. When the power interface is connected to a power supply, the power circuit feeds back a signal to the MCU. The MCU controls the power indication circuit to give an instruction based on the signal fed back by the power circuit.

The present invention has the following beneficial effects. Compared with the prior art, in the present invention, the stepless regulation element is configured for user operation, and when the stepless regulation element is operated, a signal is fed back to the MCU at real time by the stepless regulation element. The MCU adjusts the power output to the first interface through the first driving circuit based on the signal fed back by the stepless regulation element, that is, the power output to the first motor is adjusted to adjust a speed of the fan blade. In this way, a user can adjust the air speed of the fan blades according to a need, thereby solving the problem of existing fans not being able to freely adjust the air speed, improving operational performance, and enhancing user experience.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
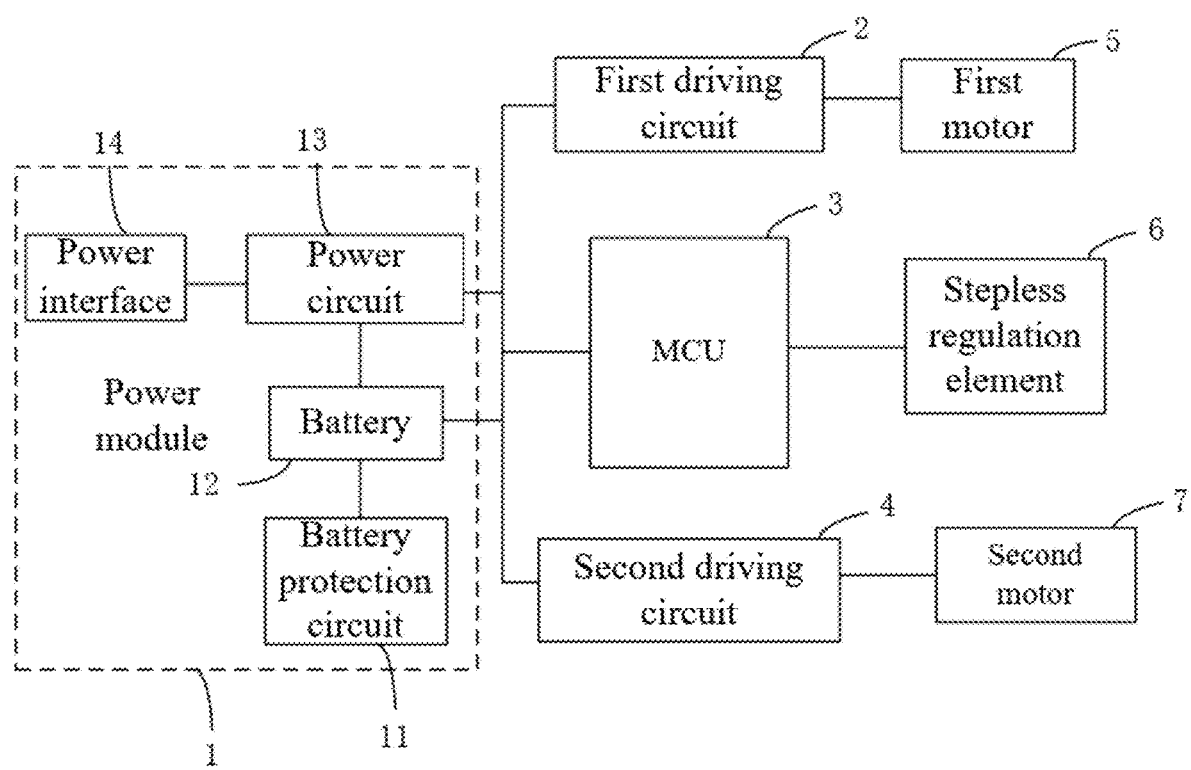
FIG. 1 is a principle block diagram of a fan of the present invention.
Figure 2:
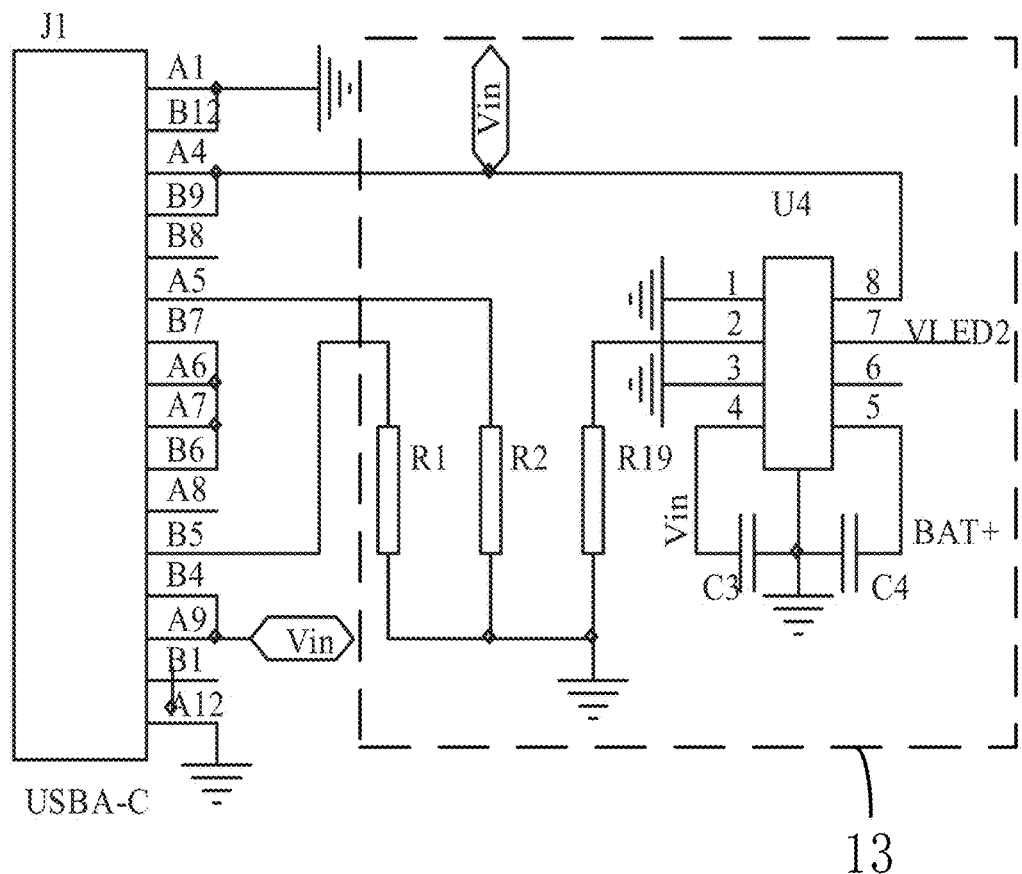
FIG. 2 is a circuit diagram of a connection between a power circuit and a power interface of the present invention.
Figure 3:
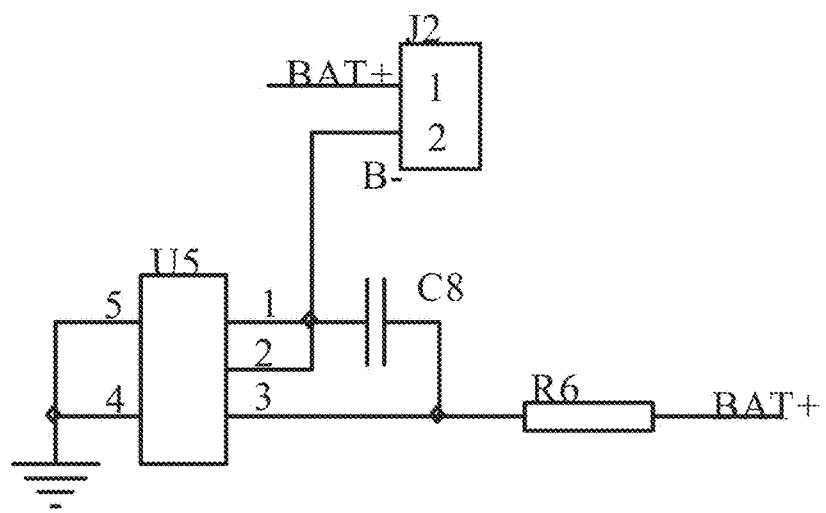
FIG. 3 is a circuit diagram of a battery protection circuit of the present invention.
Figure 4:
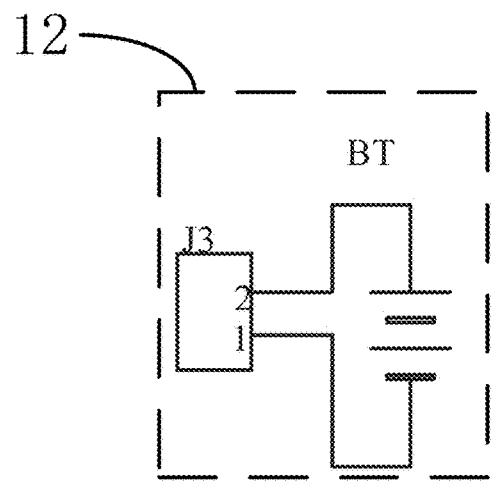
FIG. 4 is a circuit diagram of a battery of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

FIGS. 1-11 shows a stepless regulation fan in an embodiment of the present invention.

The stepless regulation fan includes a fan main body 100 and a control circuit board 200. The fan main body 100 is equipped with first motors 5 and fan blades 9 connected to the first motors 5. The control circuit board 200 includes an MCU 3, a stepless regulation element 6 and a first driving circuit 2. The stepless regulation element 6 and the first driving circuit 2 are electrically connected to the MCU 3. The stepless regulation element 6 is used for user operation, and the first driving circuit 2 is electrically connected to the first motors 5. When the stepless regulation element 6 is operated, a stepless regulation signal within a preset regulation range is fed back to the MCU. Based on the stepless regulation signal, the MCU 3 outputs a rotating speed control signal corresponding to the stepless regulation signal to the first driving circuit 2. The first driving circuit 2 adjusts driving power output to the first motors based on the rotating speed control signal.

In this embodiment, the stepless regulation element 6 is configured for user operation, and when the stepless regulation element 6 is operated, a continuously increasing or decreasing stepless regulation signal within the preset regulation range is fed back to the MCU 3. The MCU 3 adjusts the power output from the first driving circuit 2 to the first motor 5 according to the stepless regulation signal, so that the power output to the first motors 5 increases or decreases continuously, to achieve stepless regulation of a rotating speed of the fan blades 9. In this way, a user can adjust the required air speed of the fan blades 9 according to a need, thereby solving the problem of existing fans not being able to freely adjust the air speed, improving operational performance, and enhancing user experience.

In one embodiment, the stepless regulation element 6 is a potentiometer. The potentiometer includes a base 63, a movable member 61, a resistance wire 62, a first pin 66, a second pin 65, a third pin 64, and a slider 67. The resistance wire 62, the first pin 66, the second pin 65, the third pin 64, and the slider 67 are all arranged on the base 63. The movable member 61 is rotationally or slidingly provided on the base 63. The movable member 61 is connected to the slider 67. The slider 67 is electrically connected to the second pin 65, and the slider 67 is in contact with the resistance wire 62. Two ends of the resistance wire 62 are respectively electrically connected to the first pin 66 and the third pin 64. The third pin 64 is grounded, and the first pin 66 is electrically connected to the MCU 3. The slider 67 moves when the movable member 61 is operated, so that a resistance connected to the MCU 3 can be adjusted, that is, the resistance connected to the MCU 3 is continuously increased or decreased, so as to fed back the stepless regulation signal within the preset regulation range to the MCU 3. Based on this electrical signal, the MCU 3 can output a rotating speed control signal that matches the stepless regulation signal to the first driving circuit 2, so as to adjust the power output to the first motor 5.

In one embodiment, the stepless regulation element 6 is a rotary encoder switch. The rotary encoder switch includes a first pin and a second pin. Both the first pin and the second pin are electrically connected to the MCU 3. When the rotary encoder switch is rotated, the first pin and the second pin respectively feed back a continuously changing first electrical signal and a continuously changing second electrical signal to the MCU 3. The stepless regulation signal includes the first electrical signal and the second electrical signal. The MCU 3 outputs the rotating speed control signal to the first driving circuit 2 based on the changes in the first electrical signal and the second electrical signal, so as to adjust the power output to the first motors 5 and achieve stepless regulation of the rotating speed of the fan blades 9, thereby effectively solving the problem of limited air speed levels in existing fans, and meeting the user's demand for free adjustment of air speed.

In the above embodiment, the control circuit board 200 also includes a power module 1 that is electrically connected to the MCU 3, the first driving circuit 2, and the stepless regulation element 6, respectively. The power module 1 is used for supplying power to the MCU 3 and the first driving circuit 2, so as to enable the circuits on the entire control circuit board 200 to operate.

In the above embodiment, the first driving circuit 2 includes a first switch transistor Q1. A grid electrode of the first switch transistor Q1 is connected to the MCU 3, a source electrode of the first switch transistor Q1 is grounded, a drain electrode of the first switch transistor Q1 is electrically connected to a negative electrode of the first motor 5, and an output terminal of the power module 1 is electrically connected to a positive electrode of the first motor 5. When the user turns on or off the fan through the stepless regulation element 6, the MCU 3 outputs a conduction or cutoff signal to the first switch transistor Q1 based on the signal fed back by the stepless regulation element 6, to achieve the turning on and off of a first electrode through the first switch transistor Q1. Moreover, when the user adjusts the stepless regulation element 6, the first switch transistor Q1 adjusts a duty cycle of a current passing through based on the rotating speed control signal output by the MCU 3, so as to control the current output to the first motors 5 and adjust the power output to the first motors 5.

In one embodiment, the first driving circuit 2 includes a boost regulation unit 23. The boost regulation unit 23 is electrically connected to the power module 1, the MCU 3, and the first motor 5, respectively. The boost regulation unit 23 boosts a voltage output by the power module 1 according to the rotating speed control signal output by the MCU 3 and then outputs the voltage to the first motor 5 to output a voltage and power suitable for use by the first motor 5.

Specifically, the boost regulation unit 23 includes a boost unit, a first inductor L2, and a first diode D2. The output terminal of the power module 1 is electrically connected to a positive electrode of the first motor 5 through the first inductor L2 and the first diode D2 in sequence. The boost unit is electrically connected to an output terminal of the first inductor L2. The boost unit conducts at a corresponding frequency based on the rotating speed control signal output by the MCU to charge and discharge the first inductor L2, so as to boost the voltage output by the power module 1 and output the voltage to the first motor 5.

In one embodiment, the boost unit includes a boost chip U3 and a plurality of regulating resistors 22. One end of each of the regulating resistors 22 is respectively electrically connected to a different pin of the MCU 3, and an opposite end of each of the regulating resistors 22 is electrically connected to an enable pin of the boost chip U3. A switch pin of the boost chip U3 is electrically connected to the output terminal of the first inductor L2. A feedback pin of the boost chip U3 is also electrically connected to an output terminal of the first diode D2. An output pin of the boost chip U3 is connected to the output terminal of the first diode D2, and the enable pin of the boost chip U3 is electrically connected to the MCU 3.

The MCU 3 outputs an enable electrical signal to the enable pin of the boost chip U3 based on the stepless regulation signal, and selects a plurality of regulating resistors 22 to output a regulation electrical signal to the feedback pin of the boost chip U3. The boost chip U3 conducts an internal switch transistor at a corresponding frequency based on the enable electrical signal, so as to charge and discharge the first inductor L2, and to boost the voltage output by the power module 1. The output pin of the boost chip U3 adjusts the boosted voltage based on the regulation electrical signal and then outputs the boosted voltage to the first motor 5. The MCU 3 outputs an electrical signal to the feedback pin of the boost chip U3 through the regulating resistor 22, so that the voltage output to the first motor 5 can be adjusted to obtain the voltage suitable for the first motor 5, so as to drive the the first motor 5 to work.

Specifically, a total number of the regulating resistors 22 is twelve. In other embodiments, the total number of the regulating resistors 22 can also be ten, thirteen, etc.

Figure 15:
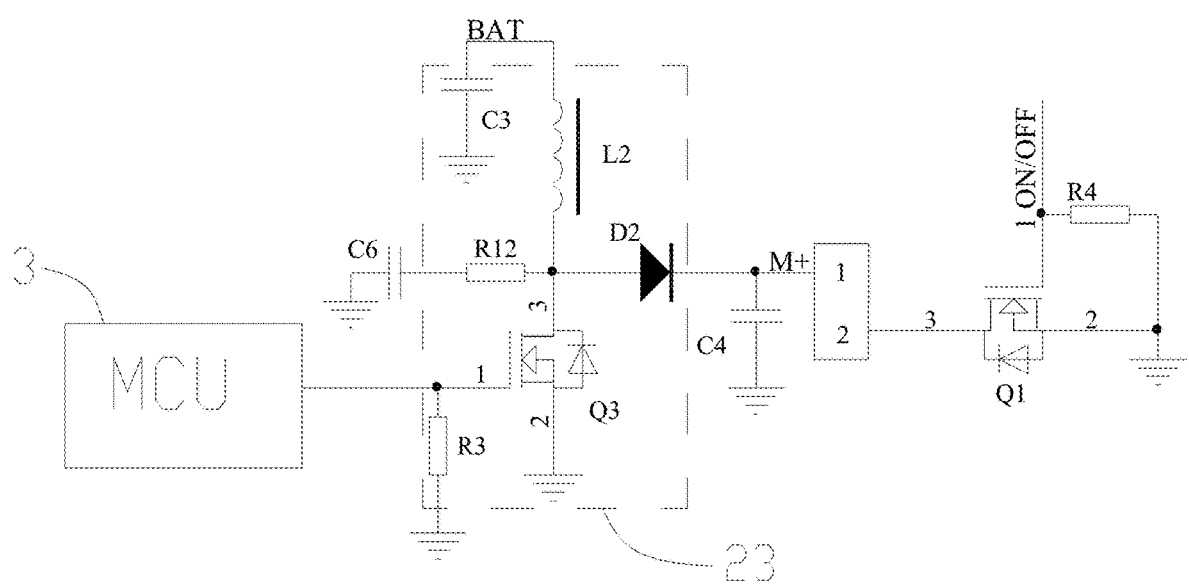
FIG. 15 is circuit diagram of an electrical connection between a first driving circuit, an MCU, and a first interface according to another embodiment of the present invention.

In another embodiment, as shown in FIG. 15, the boost unit includes a second switch transistor. A first end of the second switch transistor is electrically connected to the MCU 3, a second end of the second switch transistor is grounded, and a third end of the second switch transistor is electrically connected to the output terminal of the first inductor L2. The second switch transistor receives a PWM signal output by the MCU 3 for turning on and off, so as to boost and regulate the voltage output by the power module 1 through the first inductor L2. The first inductor L2 outputs the boosted voltage to the first motor 5 to obtain the voltage suitable for the first motor 5, so that the first motor 5 is driven to work.

Figure 5:
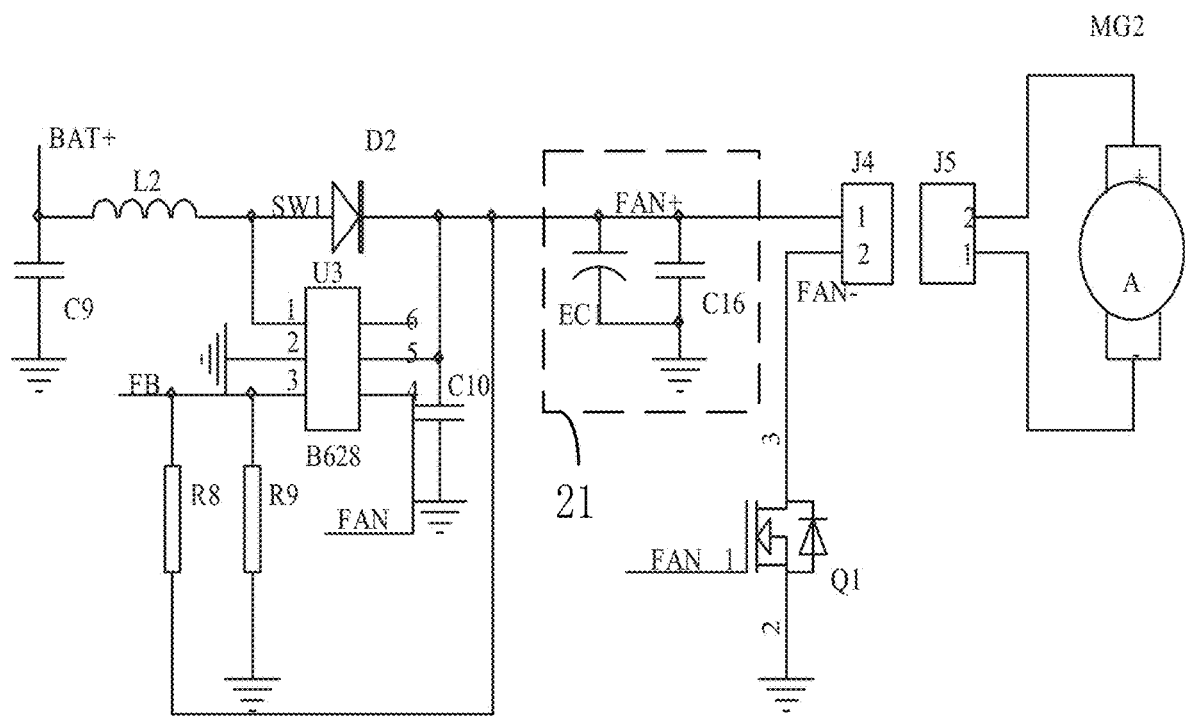
FIG. 5 is a partial circuit diagram of a first driving circuit of the present invention.
Figure 6:
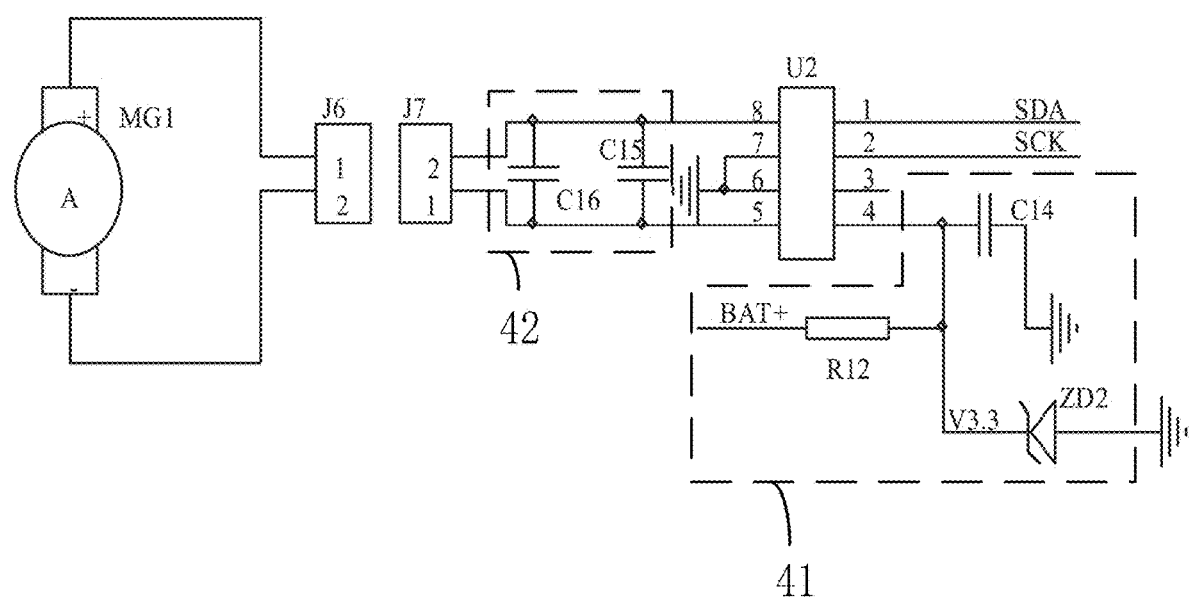
FIG. 6 is a circuit diagram of a second driving circuit of the present invention.
Figure 7:
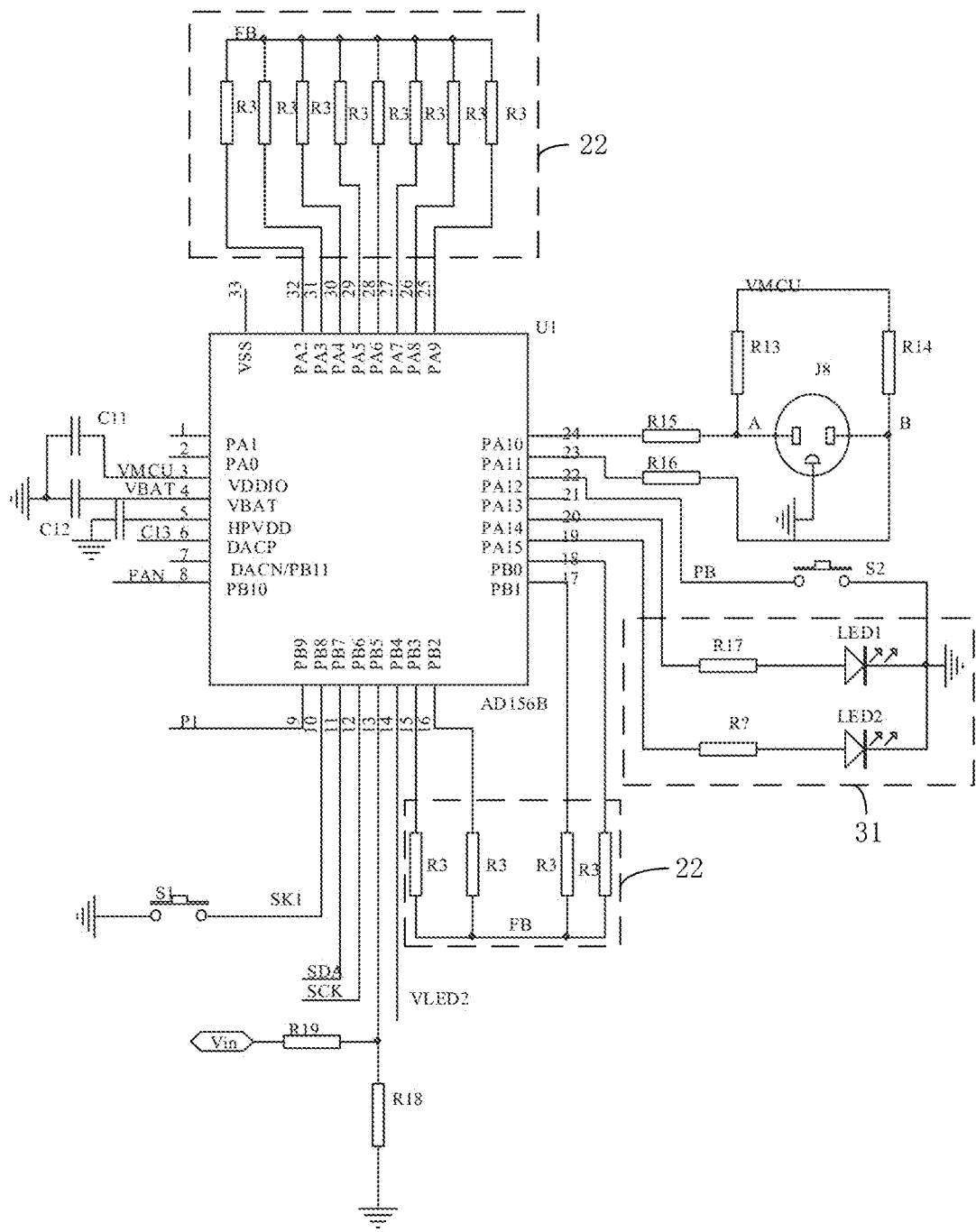
FIG. 7 is a circuit diagram in which an MCU is connected to a power indication circuit and a stepless regulation element according to the present invention.
Figure 8:
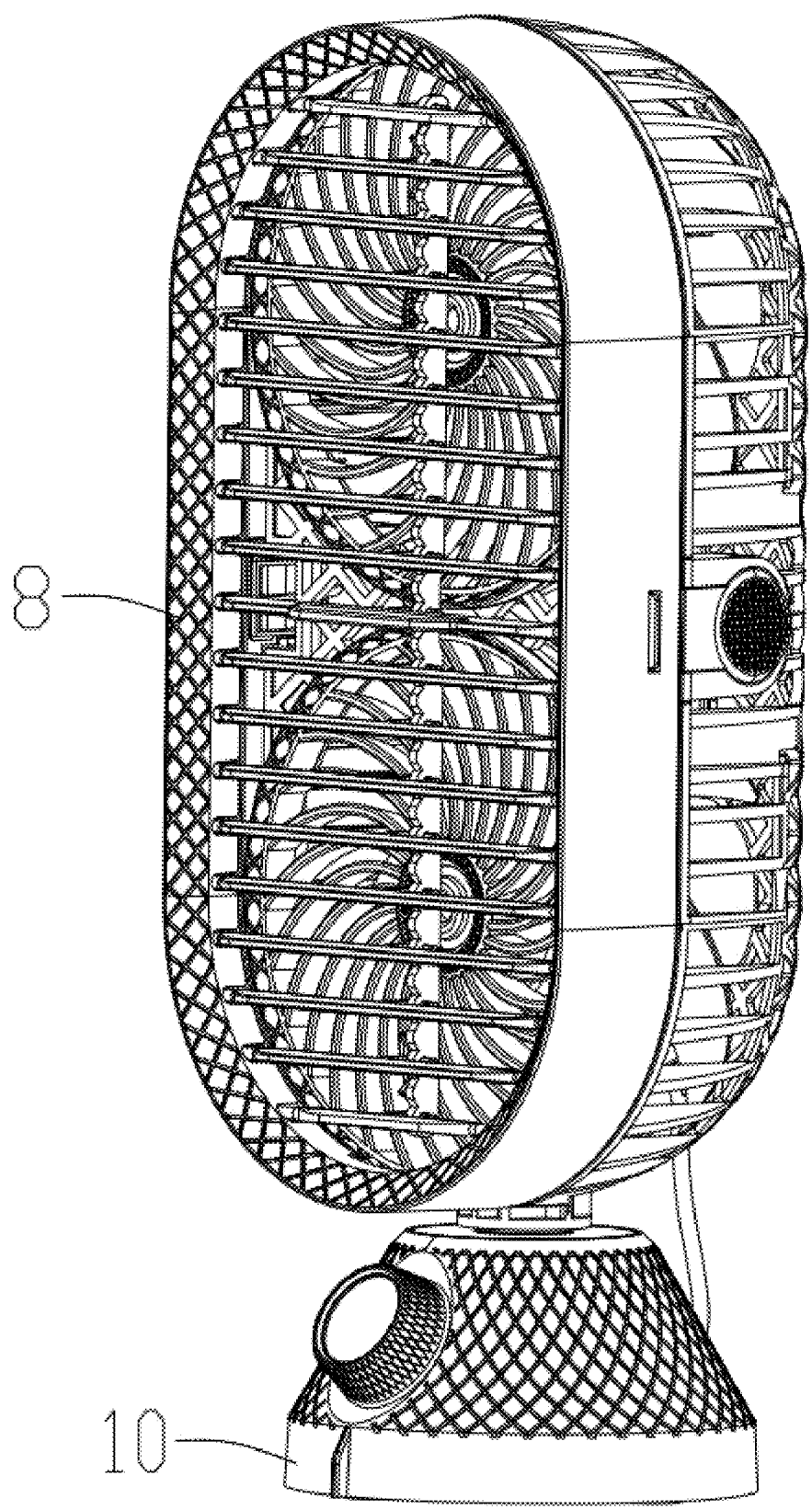
FIG. 8 is a perspective view of a fan of the present invention.
Figure 9:
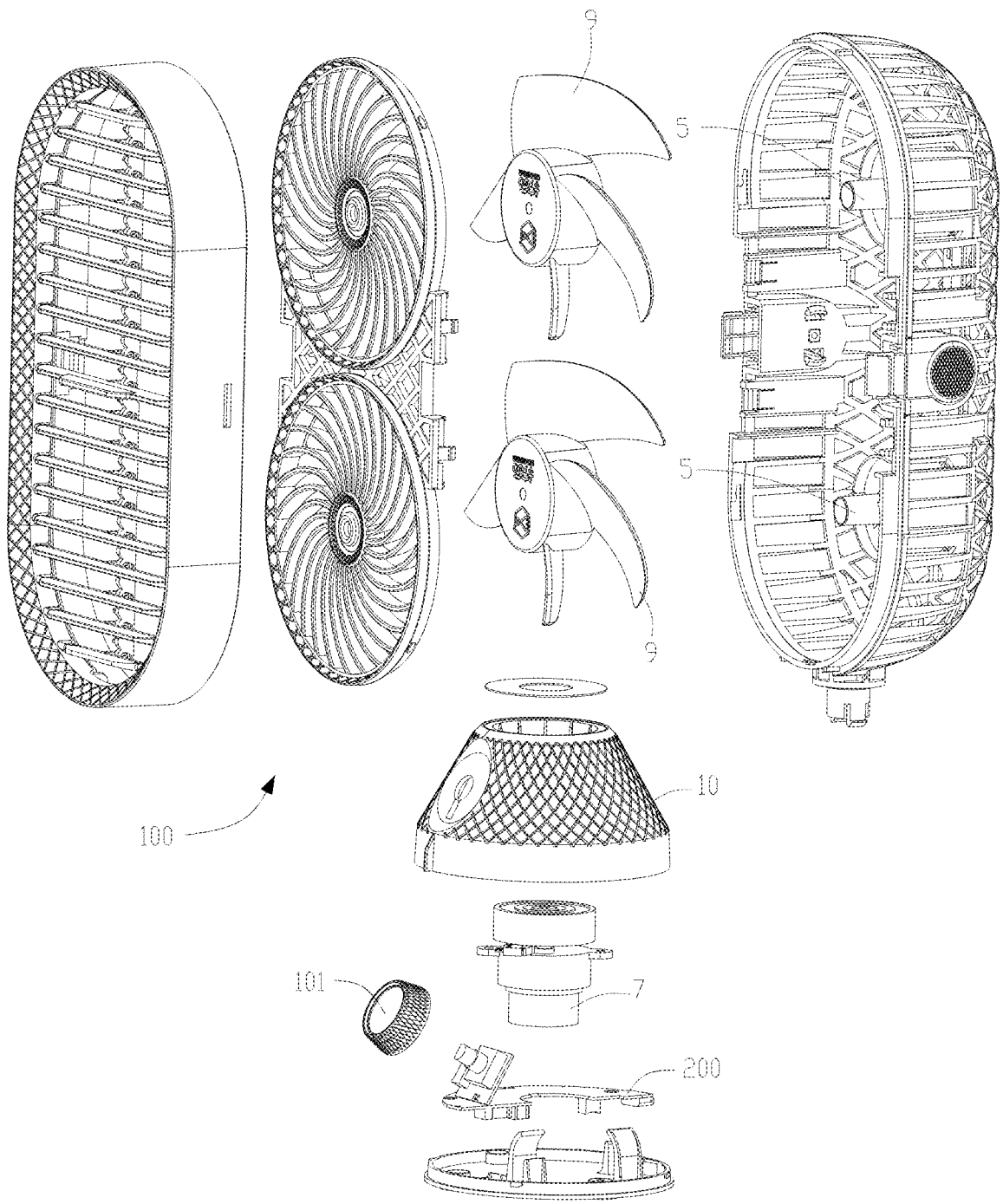
FIG. 9 is an exploded view of a fan of the present invention.
Figure 10:
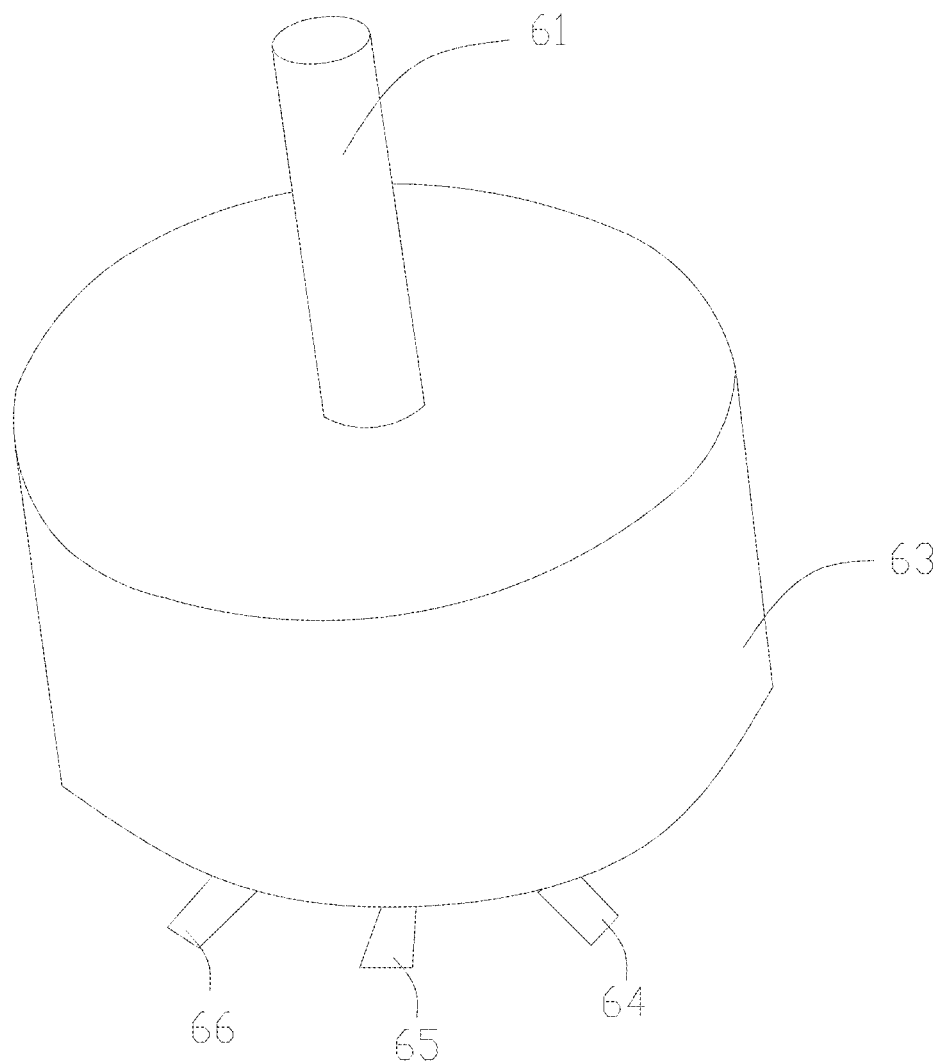
FIG. 10 is a schematic diagram of a potentiometer of the present invention.
Figure 11:
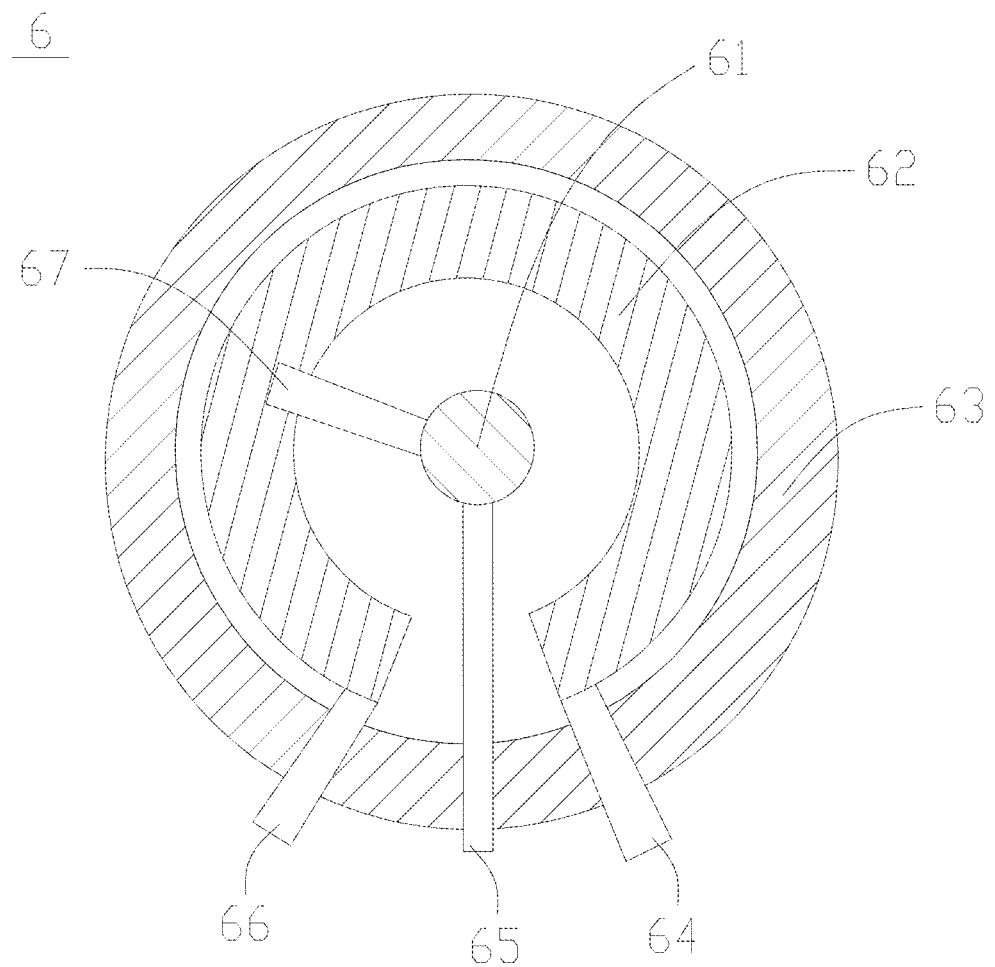
FIG. 11 is a structural diagram of a potentiometer of the present invention.

Referring to FIGS. 5-7, in the embodiments of the different boost units mentioned above, the first driving circuit 2 may further include a first filtering unit 21. The first filtering unit 21 includes a filtering capacitor C16. One end of the filtering capacitor C16 is grounded, and an opposite end of the filtering capacitor C16 is electrically connected to the output terminal of the first diode D2. Through the filtering capacitor C16, a stable voltage can be output to the first motor 5 after filtering.

In one embodiment, the first driving circuit 2 further includes a first interface J4. The first interface J4 is electrically connected to the first motor 5. A drain electrode of the first switch S2 is electrically connected to the negative electrode of the first motor 5 through the first interface J4, and the output terminal of the power module 1 is electrically connected to the positive electrode of the first motor 5 through the first interface J4. By using the first interface J4, it is convenient for the control circuit board 200 to be electrically connected to the first motor 5 through a wiring terminal.

In one embodiment, the fan main body 100 includes an operating member 101. The operating member 101 is connected to the stepless regulation element 6. The stepless regulation element 6 follows the operating member 101 to move when the operating member 101 is operated. The operating member 101 is arranged on the fan main body 100 through one of the ways of rotating, rolling, and sliding.

Specifically, when the stepless regulation element 6 is a rotary potentiometer or digital encoder, the operating member 101 can be connected to a knob on the stepless regulation element 6, so that when the operating member 101 rotates or rolls, the knob can rotate together to adjust the stepless regulation element 6. When the stepless regulation element 6 is a sliding resistor, the operating member 101 is arranged on a sliding element on the sliding resistor, so that a resistance of the regulating resistor 22 can be adjusted when the operating member 101 slides.

In one embodiment, the fan main body 100 includes a fan head 8, a supporting base 10, and a second motor 7 for controlling rotation of the fan head 8. The first motors 5 and the fan blades 9 are both mounted on the fan head 8, the second motor 7 is mounted on the supporting base 10 or the fan head 8, and the control circuit board 200 is mounted on the fan head 8 or the supporting base 10. The control circuit board 200 also includes a second driving circuit 4 and a first switch S2 both electrically connected to the MCU 3. The second driving circuit 4 is electrically connected to the power module 1 and the second motor 7, respectively. The MCU 3 drives the second motor 7 to operate through the second driving circuit 4 based on an electrical signal fed back by the first switch S2. Specifically, when the second motor 7 is arranged on the supporting base 10, a rotating shaft of the second motor 7 is connected to the fan head 8, so that when the user operates the first switch S2, the second driving circuit 4 drives the second motor 7 to rotate through an electrical signal output by the MCU 3, thereby driving the fan head 8 to rotate. When the second motor 7 is arranged on the fan head 8, the rotating shaft of the second motor 7 is fixed on the supporting base 10. When the second motor 7 is driven, the fan head 8 can also be driven to rotate by a reaction force.

In one embodiment, the second driving circuit 4 includes a motor driving chip U2, a second filtering unit 41, a third filtering unit 42, and a second interface J7. The second filtering unit 41 is electrically connected to the output terminal of the power module 1 and the motor driving chip U2, respectively. The second filtering unit 41 is used for filtering the voltage output by the power module 1 and then supplying the voltage to the motor driving chip U2. The third filtering unit 42 is electrically connected to the motor driving chip U2 and the second interface J7, respectively. The second interface J7 is electrically connected to the second motor 7. The third filtering unit 42 is used for filtering a driving voltage output by the motor driving chip U2 and then supplying the driving voltage to the second motor 7. A sixth pin and a seventh pin of the motor driving chip U2 are both grounded. An SDA pin and an SCK pin on the motor driving chip U2 are respectively electrically connected to the MCU 3. Through the second interface J7, it is convenient for the control circuit board 200 to be electrically connected to the second motor 7 through a wiring terminal. Moreover, the motor driving chip U2 can drive the second motor 7 to operate through the signal output by the MCU 3, achieving the shaking of the fan head 8.

In the above embodiment, the motor driving chip U2 can be a chip of 118S model, and the MCU 3 can be a chip of AD156B model.

In one embodiment, the stepless regulation element 6 is a press switch encoder, and the first switch S2 is a switch on the press switch encoder, that is, the switch on the press switch encoder is electrically connected to the MCU 3. When the user presses the encoder, the switch on the encoder is closed. After the MCU 3 detects that the switch is closed, the MCU 3 outputs a driving signal to the motor driving chip U2 to control the operation of the second motor 7.

In one embodiment, the power module 1 includes a power interface 14 for connecting to a power supply and a power circuit 13 electrically connected to the power interface 14. The power circuit 13 is respectively electrically connected to the MCU 3, the first driving circuit 2, the second driving circuit 4, and the stepless regulation element 6, so as to process the power input from the power interface 14 and then supply power to the MCU 3, the first driving circuit 2, the second driving circuit 4, and the stepless regulation element 6.

In one embodiment, the power module 1 further includes a battery 12 electrically connected to the power circuit 13. The power circuit 13 is a charging and discharging circuit used for charging the battery 12 with the power input from the power interface 14. By using the power circuit 13, the charging and discharging of the battery 12 can be achieved.

In one embodiment, the power circuit 13 includes a charging and discharging chip U4. The charging and discharging chip U4 is electrically connected to the power interface 14 and a positive electrode of the battery 12, respectively. The charging and discharging chip U4 is electrically connected to the MCU 3 for detecting a temperature of the MCU 3.

In one embodiment, the power module 1 further includes a battery protection circuit 11 electrically connected to the power circuit 13 and the battery 12, respectively. The battery protection circuit 11 stops charging the battery 12 when the battery 12 is overcharged or stops the battery 12 from continuing to output voltage when the battery 12 is over discharged, playing a role in protecting the battery 12 and preventing overcharging or over discharging from shortening a lifespan of the battery 12.

In one embodiment, the control circuit board 200 also includes a power indication circuit 31 electrically connected to the MCU 3. When the power interface 14 is connected to a power supply, the power circuit 13 feeds back a signal to the MCU 3. The MCU 3 controls the power indication circuit 31 to give an instruction based on the signal fed back by the power circuit 13 to remind the user that the fan is powered on normally.

Specifically, the power circuit 13 includes a charging and discharging chip U4, a fifth resistor R1, a fourth capacitor C3, and a fifth capacitor C4. A second pin of the charging and discharging chip U4 is grounded through the fifth resistor R1, a fourth pin of the charging and discharging chip U4 is grounded through the fourth capacitor C3, and a fifth pin of the charging and discharging chip U4 is grounded through the fifth capacitor C4. The positive electrode of the battery 12 is electrically connected to the fifth pin of the charging and discharging chip U4, and a seventh pin of the charging and discharging chip U4 is electrically connected to the MCU 3 for detecting a temperature of the MCU 3. The power interface 14 is a Type-C interface, and the charging and discharging chip U4 is a chip of 4056 model, which can be specifically a chip of TP4056, AXS4056 and other models, so as to achieve charging and discharging of the battery 12.

The battery protection circuit 11 includes a battery protection chip U5, a sixth capacitor C8, and a sixth resistor R6. A first pin of the battery protection chip U5 is connected to a third pin of the battery protection chip U5 through the sixth capacitor C8. The third pin of the battery protection chip U5 is connected to the fifth pin of the charging and discharging chip U4 through the sixth resistor R6. A second pin of the battery protection chip U5 is connected to its own first pin. The second pin of the battery protection chip U5 is also connected to a negative electrode of the battery 12. A fourth pin and a fifth pin of the battery protection chip U5 are both grounded. The battery protection chip U5 can be a chip of 5352 model.

In one embodiment, the second filtering unit 41 includes a fourth resistor R12, a second capacitor C14, and a second diode ZD2. An output terminal of the power circuit 13 is connected to a fourth pin of the motor driving chip U2 through the fourth resistor R12, and the fourth pin of the motor driving chip U2 is also grounded through the second capacitor C14. A positive electrode of the second diode ZD2 is grounded, and a negative electrode of the second diode ZD2 is electrically connected to the fourth pin of the motor driving chip U2. The voltage output by the power circuit 13 is reduced by the fourth resistor R12 and stabilized by the second diode ZD2 to supply power to the motor driving chip U2.

In one embodiment, the third filtering unit 42 includes a third capacitor C15. One end of the third capacitor C15 is electrically connected to the second interface J7 and an eighth pin of the motor driving chip U2, and an opposite end of the third capacitor C15 is respectively electrically connected to the second interface J7 and a fifth pin of the motor driving chip U2. The voltage output by the motor driving chip U2 is filtered by the third capacitor C15 and then supplied to the second motor 7 for use through the second interface J7, so as to prevent noise waves from affecting the stability of the operation of the second motor 7.

Figure 12:
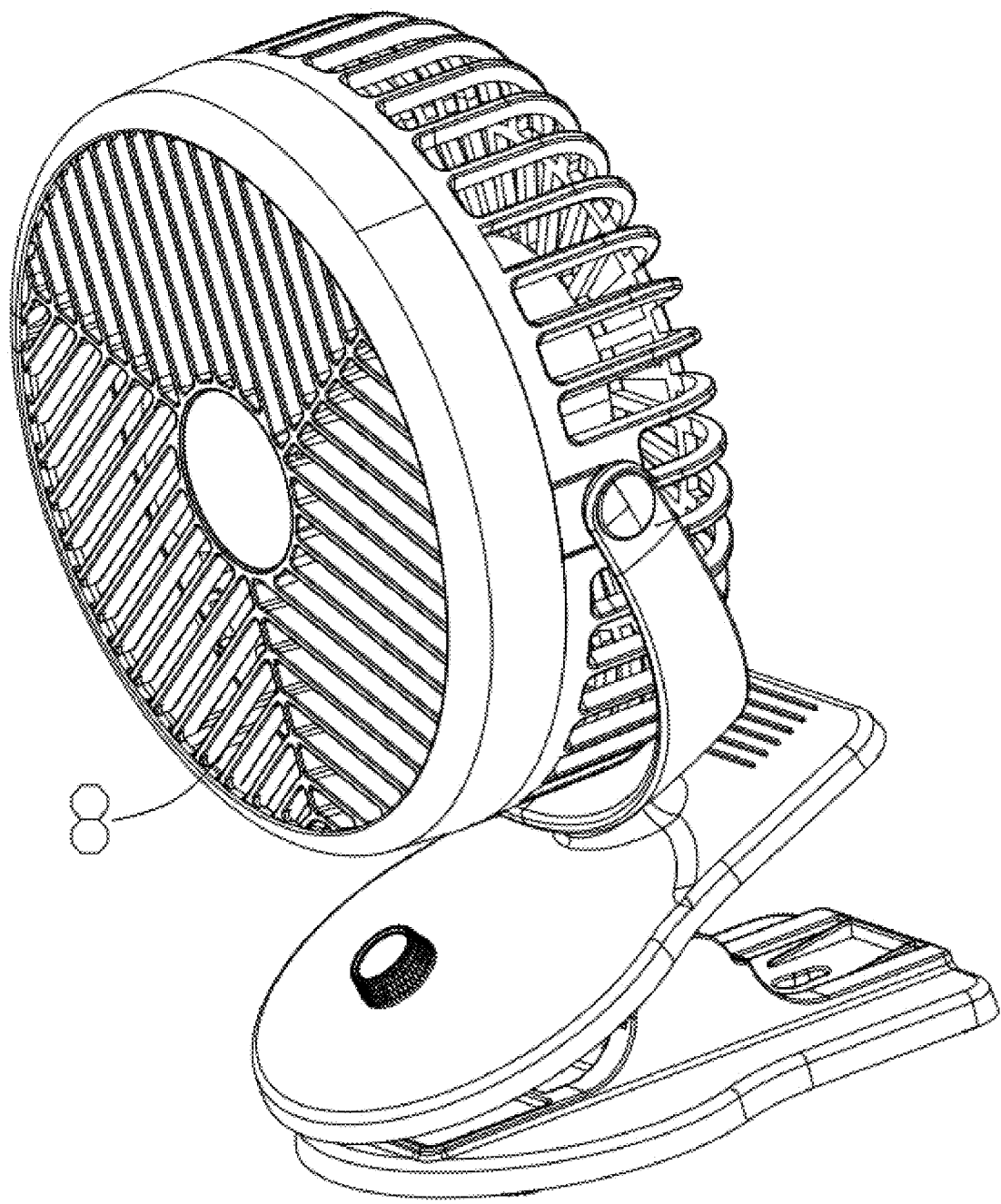
FIG. 12 is a schematic diagram of a fan according to an embodiment of the present invention.
Figure 13:
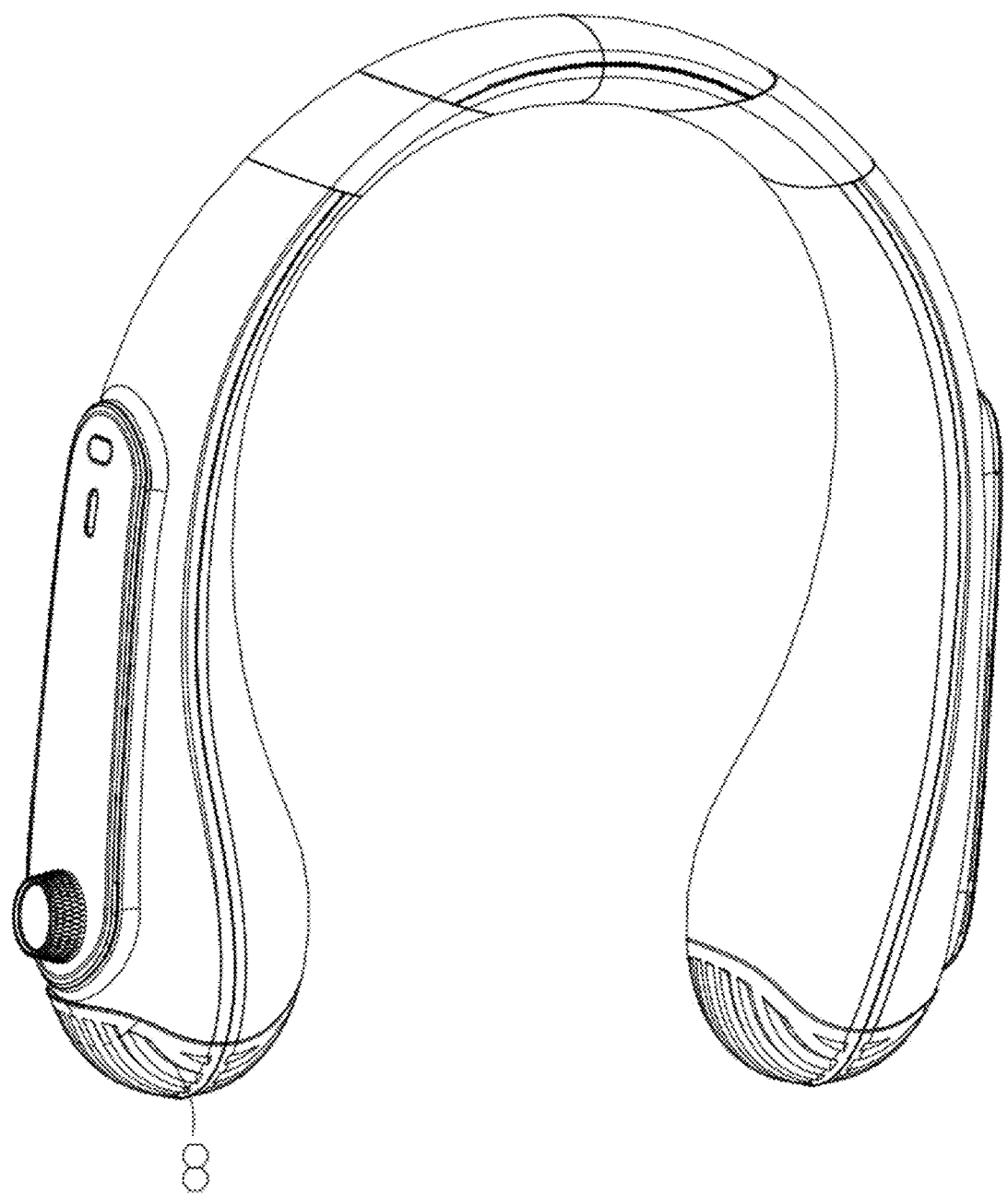
FIG. 13 is a schematic diagram of a fan according to an embodiment of the present invention.
Figure 14:
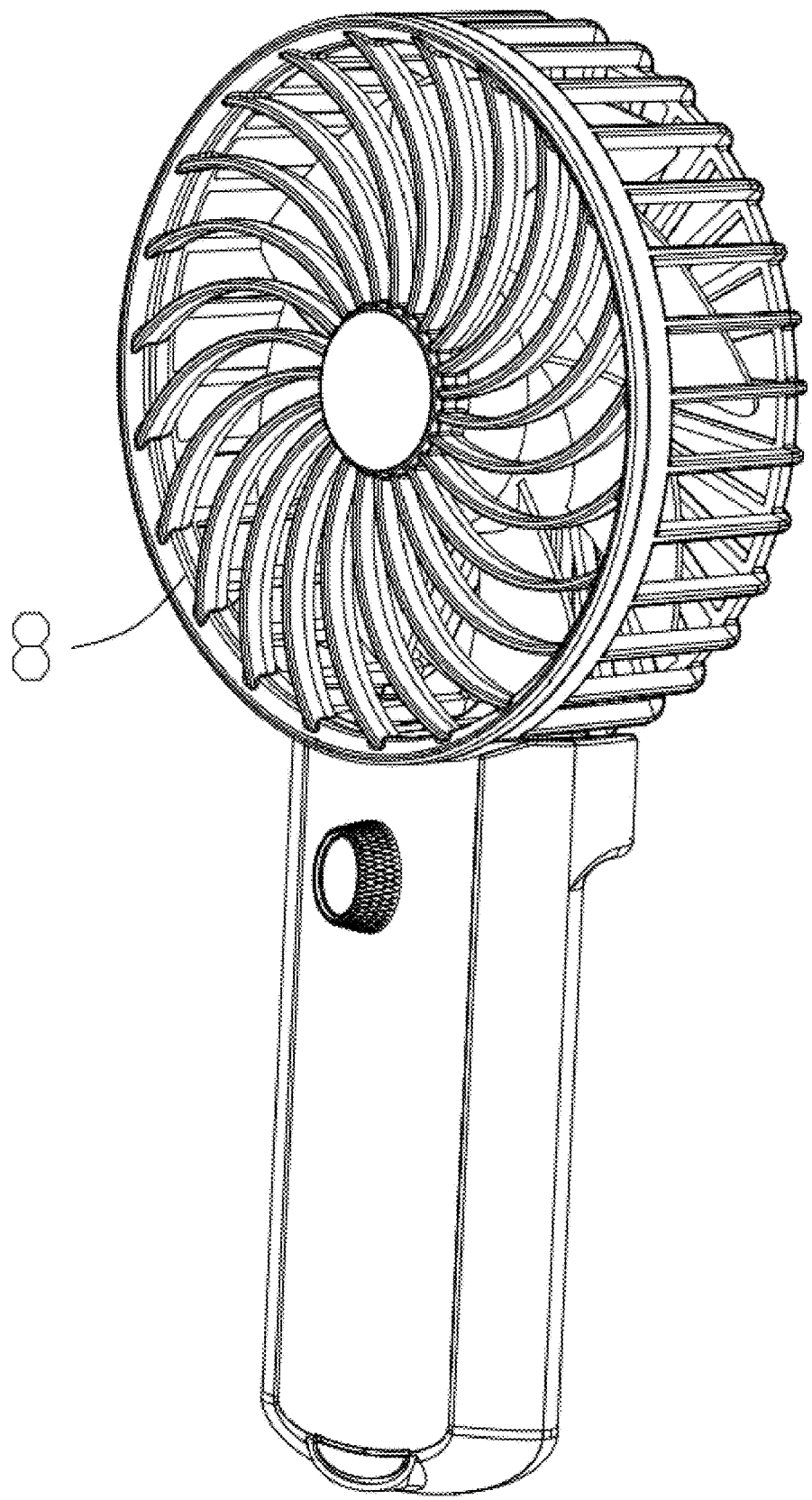
FIG. 14 is a schematic diagram of a fan according to an embodiment of the present invention.

In the above embodiments, the circuit on the control circuit board 200 can also be applied to a handheld fan (as shown in FIG. 14), a clamped fan (as shown in FIG. 12), or in embodiments without the second motor 7. The control circuit can also be applied to a neck fan (as shown in FIG. 13), etc.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A stepless regulation fan, comprising a fan main body and a control circuit board, the fan main body being equipped with first motors and fan blades connected to the first motors, wherein the control circuit board comprises an MCU, a stepless regulation element and a first driving circuit; the stepless regulation element and the first driving circuit are electrically connected to the MCU; the stepless regulation element is used for user operation, and the first driving circuit is electrically connected to the first motors;
when the stepless regulation element is operated, a stepless regulation signal within a preset regulation range is fed back to the MCU; based on the stepless regulation signal, the MCU is configured for outputting a rotating speed control signal corresponding to the stepless regulation signal to the first driving circuit; and the first driving circuit is configured for adjusting driving power output to the first motors based on the rotating speed control signal,
wherein the control circuit board also comprises a power module that is electrically connected to the MCU, the first driving circuit, and the stepless regulation element, respectively,
wherein the first driving circuit comprises a first switch transistor, a grid electrode of the first switch transistor is connected to the MCU, a source electrode of the first switch transistor is grounded, a drain electrode of the first switch transistor is electrically connected to a negative electrode of the first motor, and an output terminal of the power module is electrically connected to a positive electrode of the first motor; and the first switch transistor adjusts the power output to the first motor based on the rotating speed control signal output by the MCU,
wherein the first driving circuit further comprises a first interface, and the first interface is electrically connected to the first motor; a drain electrode of the first switch is electrically connected to the negative electrode of the first motor through the first interface, and the output terminal of the power module is electrically connected to the positive electrode of the first motor through the first interface.

2. A stepless regulation fan, comprising a fan main body and a control circuit board, the fan main body being equipped with first motors and fan blades connected to the first motors, wherein the control circuit board comprises an MCU, a stepless regulation element and a first driving circuit; the stepless regulation element and the first driving circuit are electrically connected to the MCU; the stepless regulation element is used for user operation, and the first driving circuit is electrically connected to the first motors;
when the stepless regulation element is operated, a stepless regulation signal within a preset regulation range is fed back to the MCU; based on the stepless regulation signal, the MCU is configured for outputting a rotating speed control signal corresponding to the stepless regulation signal to the first driving circuit; and the first driving circuit is configured for adjusting driving power output to the first motors based on the rotating speed control signal, wherein the stepless regulation element is a potentiometer;
the potentiometer comprises a base, a movable member, a resistance wire, a first pin, a second pin, a third pin, and a slider; the resistance wire, the first pin, the second pin, the third pin, and the slider are all arranged on the base; the movable member is rotationally or slidingly provided on the base, the movable member is connected to the slider, the slider is electrically connected to the second pin, the slider is in contact with the resistance wire, two ends of the resistance wire are respectively electrically connected to the first pin and the third pin, the third pin is grounded, and the first pin is electrically connected to the MCU;
the slider moves when the movable member is operated, so that a resistance connected to the MCU is continuously increased or decreased to feed back the stepless regulation signal within the preset regulation range to the MCU.

3. The stepless regulation fan according to claim 1, wherein the stepless regulation element is a rotary encoder switch, the rotary encoder switch comprises a first pin and a second pin, and both the first pin and the second pin are electrically connected to the MCU;
when the rotary encoder switch is rotated, the first pin and the second pin respectively feed back a continuously changing first electrical signal and a continuously changing second electrical signal to the MCU, the MCU outputs the rotating speed control signal to the first driving circuit based on the changes in the first electrical signal and the second electrical signal, the stepless regulation signal comprises the first electrical signal and the second electrical signal.

4. The stepless regulation fan according to claim 1, wherein the first driving circuit comprises a boost regulation unit; the boost regulation unit is electrically connected to the power module, the MCU, and the first motor, respectively;
the boost regulation unit boosts a voltage output by the power module according to the rotating speed control signal output by the MCU and then outputs the voltage to the first motor.

5. The stepless regulation fan according to claim 4, wherein the boost regulation unit comprises a boost unit, a first inductor, and a first diode;
the output terminal of the power module is electrically connected to a positive electrode of the first motor through the first inductor and the first diode in sequence, and the boost unit is electrically connected to an output terminal of the first inductor;

the boost unit conducts at a corresponding frequency based on the rotating speed control signal output by the MCU to charge and discharge the first inductor, so as to boost the voltage output by the power module and output the voltage to the first motor.

6. The stepless regulation fan according to claim 5, wherein the boost unit comprises a boost chip and a plurality of regulating resistors, one end of each of the regulating resistors is respectively electrically connected to a different pin of the MCU, and an opposite end of each of the regulating resistors is electrically connected to an enable pin of the boost chip;

a switch pin of the boost chip is electrically connected to the output terminal of the first inductor, a feedback pin of the boost chip is also electrically connected to an output terminal of the first diode, an output pin of the boost chip is connected to the output terminal of the first diode, and the enable pin of the boost chip is electrically connected to the MCU;

the MCU outputs an enable electrical signal to the enable pin of the boost chip based on the stepless regulation signal, and selects a plurality of regulating resistors to output a regulation electrical signal to the feedback pin of the boost chip; the boost chip conducts an internal switch transistor at a corresponding frequency based on the enable electrical signal, so as to charge and discharge the first inductor, and to boost the voltage output by the power module; the output pin of the boost chip adjusts the boosted voltage based on the regulation electrical signal and then outputs the boosted voltage to the first motor.

7. The stepless regulation fan according to claim 6, wherein a total number of the regulating resistors is twelve.

8. The stepless regulation fan according to claim 5, wherein the boost unit comprises a second switch transistor, a first end of the second switch transistor is electrically connected to the MCU, a second end of the second switch transistor is grounded, and a third end of the second switch transistor is electrically connected to the output terminal of the first inductor;

the second switch transistor receives a PWM signal output by the MCU for turning on and off, so as to boost and regulate the voltage output by the power module through the first inductor; and the first inductor outputs the boosted voltage to the first motor.

9. The stepless regulation fan according to claim 1, wherein the first driving circuit further comprises a first filtering unit, the first filtering unit comprises a filtering capacitor, one end of the filtering capacitor is grounded, and an opposite end of the filtering capacitor is respectively electrically connected to the first interface and the output terminal of the first diode.

10. The stepless regulation fan according to claim 1, wherein the fan main body comprises an operating member, the operating member is connected to the stepless regulation element, and the stepless regulation element follows the operating member to move when the operating member is operated;

the operating member is arranged on the fan main body through one of the ways of rotating, rolling, and sliding.

11. The stepless regulation fan according to claim 1, wherein the fan main body comprises a fan head, a supporting base, and a second motor for controlling rotation of the fan head; the first motors and the fan blades are both mounted on the fan head, the second motor is mounted on the supporting base or the fan head, and the control circuit board is mounted on the fan head or the supporting base;

the control circuit board also comprises a second driving circuit and a first switch both electrically connected to the MCU; the second driving circuit is electrically connected to the power module and the second motor, respectively; and the MCU drives the second motor to operate through the second driving circuit based on an electrical signal fed back by the first switch.

12. The stepless regulation fan according to claim 11, wherein the second driving circuit comprises a motor driving chip, a second filtering unit, a third filtering unit, and a second interface; the second filtering unit is electrically connected to an output terminal of the power circuit and the motor driving chip, respectively; the second filtering unit is used for filtering a voltage output by the power circuit and then supplying the voltage to the motor driving chip; the third filtering unit is electrically connected to the motor driving chip and the second interface, respectively; the second interface is electrically connected to the second motor, the third filtering unit is used for filtering a driving voltage output by the motor driving chip and then supplying the driving voltage to the second motor, a sixth pin and a seventh pin of the motor driving chip are both grounded, and an SDA pin and an SCK pin on the motor driving chip are respectively electrically connected to the MCU.

13. The stepless regulation fan according to claim 11, wherein the stepless regulation element is a press switch encoder, and the first switch is a switch on the press switch encoder.

14. The stepless regulation fan according to claim 1, wherein the power module comprises a power interface for connecting to a power supply and a power circuit electrically connected to the power interface; and the power circuit is respectively electrically connected to the MCU and the first driving circuit.

15. The stepless regulation fan according to claim 14, wherein the power module further comprises a battery electrically connected to the power circuit; and the power circuit is a charging and discharging circuit used for charging the battery with the power input from the power interface;

the power circuit comprises a charging and discharging chip; the charging and discharging chip is electrically connected to the power interface and a positive electrode of the battery, respectively; and the charging and discharging chip is electrically connected to the MCU for detecting a temperature of the MCU.

16. The stepless regulation fan according to claim 15, wherein the power module further comprises a battery protection circuit electrically connected to the power circuit and the battery, respectively; the battery protection circuit stops charging the battery when the battery is overcharged or stops the battery from continuing to output voltage when the battery is over discharged, and the battery protection circuit comprises a battery protection chip electrically connected to the battery.

17. The stepless regulation fan according to claim 14, wherein the control circuit board also comprises a power indication circuit electrically connected to the MCU; when the power interface is connected to a power supply, the power circuit feeds back a signal to the MCU, and the MCU controls the power indication circuit to give an instruction based on the signal fed back by the power circuit.

18. A stepless regulation fan, comprising a fan main body and a control circuit board, the fan main body being equipped with first motors and fan blades connected to the first motors, wherein the control circuit board comprises an MCU, a stepless regulation element and a first driving circuit; the stepless regulation element and the first driving circuit are electrically connected to the MCU; the stepless regulation element is used for user operation, and the first driving circuit is electrically connected to the first motors;

when the stepless regulation element is operated, a stepless regulation signal within a preset regulation range is fed back to the MCU; based on the stepless regulation signal, the MCU is configured for outputting a rotating speed control signal corresponding to the stepless regulation signal to the first driving circuit; and the first driving circuit is configured for adjusting driving power output to the first motors based on the rotating speed control signal, wherein the control circuit board also comprises a battery electrically connected to the MCU, the first driving circuit, and the stepless regulation element, respectively, and the first driving circuit comprises a first switch transistor, a second switch transisitor, a first inductor, and a first diode, wherein a first electrode of the first switch transistor is grounded, a second electrode of the first switch transistor is electrically connected to a negative electrode of the first motor, such that the first switch transistor is configured to switch on or switch off the first motor under controls of a control signal of a control electrode of the first switch transistor, an end of the battery is electrically connected to a positive electrode of the first motor through the first inductor and the first diode in sequence, the other end the battery is grounded, a first end of the second switch transistor is electrically connected to the MCU, a second end of the second switch transistor is grounded, and a control end of the second switch transistor is electrically connected to a node between the first inductor and the first diode;

the second switch transistor is configured to receive a PWM signal output by the MCU for turning on and off, so as to boost and regulate a DC voltage output by the battery through the first inductor, and the first inductor is configured to output a boosted DC voltage to the positive electrode of the first motor.

19. The stepless regulation fan according to claim 18, wherein the stepless regulation element is a rotary encoder switch, the rotary encoder switch comprises a first pin, a second pin and a third pin, the first pin is connected to the MCU, the second pin is connected to the MCU via at least one resistor, a third pin is grounded, when the rotary encoder switch is rotated, the first pin and the second pin respectively feed back a continuously changing first electrical signal and a continuously changing second electrical signal to the MCU, the MCU outputs the rotating speed control signal to the first driving circuit based on the changes in the first electrical signal and the second electrical signal, the stepless regulation signal comprises the first electrical signal and the second electrical signal.

20. The stepless regulation fan according to claim 19, wherein the at least one resistor is connected between the first pin and the second pin, and the first pin and the second pin are connected to the same end of the MCU.

\* \* \* \* \*